Figure 1:
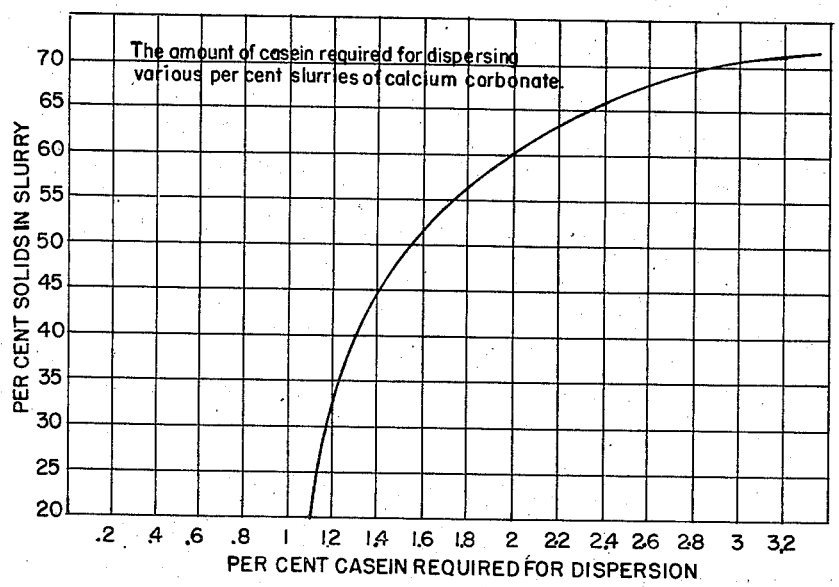

INVENTORS
AUSKER E. HUGHES,
HAROLD B. BROWNE and
HOWARD F. RODERICK.
BY Oberlin, Limbach + Day
ATTORNEYS Patented June 20, 1944

UNITED STATES PATENT OFFICE 2,351,683

MANUFACTURE OF CALCIUM CARBONATE-ADHESIVE COATINGS

Ausker E. Hughes, Wyandotte, Harold B. Browne, Trenton, and Howard F. Roderick, Grosse Ile, Mich., assignors, by mesne assignments, to Wyandotte Chemicals Corporation, Wyandotte, Mich., a corporation of Michigan Application October 12, 1940, Serial No. 361,010

9 Claims. (Cl. 106—148)

The present invention relates to the manufacture of a coating composed of a pigment in the form of finely divided, precipitated calcium carbonate and the adhesive casein, or "Alpha Protein," adapted to bind and bond the coating to the surface to which it is to be applied. "Alpha Protein" is a trade-mark bearing registration #368,826 the description of the product being "extracted protein from soybean". Such calcium carbonate-adhesive coatings are applied to the surface which they are intended to cover, protect or improve by first being placed in an aqueous suspension of such consistency and viscosity that they may be spread in a covering film upon the surface and then dried. The coating is most particularly adapted for use as a paper coating and as a cold water paint.

Calcium carbonate has previously been recognized as a desirable pigment for use in the paper coating and cold water paint arts, due primarily to its low cost and superior covering power. However, calcium carbonate pigment has been subject to the practical disadvantage in its use in such arts in that it has required a relatively high proportion of adhesive, which latter ingredient is a relatively dear one as compared to the cost of the former. Thus, as high as 25% to 35% adhesive, such as casein, starch and extracted protein from soybean protein ("Alpha Protein" being here defined as a soya bean protein extracted by alkaline treatment after removal of the oil from the crushed and pulverized soya bean), have previously been found necessary in order to produce specified degrees of adhesion of the coating film to the surface. We have discovered, through the medium of our invention, that this adhesive requirement can be reduced to as low as 12% without sacrificing the adhesive characteristics of the coating and thus resulting in a very substantial cost savings for the coating.

The calucium carbonate pigment particularly adapted for use in the practice of our invention is of the high grade type possessing the desired fine particle size and suitably produced by a precipitation process such as more fully described and covered in Roderick U. S. Patent No. 2,164,943, issued July 4, 1939. There are other grades of precipitated or "artificial" calcium carbonate, namely a coarse grade and a colloidal grade, which are, of course, not acceptable in the paper coating and cold water paint arts and hence, not regarded as within the scope of our invention. The high grade, precipitated, calcium carbonate, used as an ingredient in the coating product of our invention, may be more particularly defined as having a particle size ranging from 1 to 5 microns.

Heretofore, the efforts of solving the problem of reducing the adhesive requirement for a calcium carbonate-adhesive coating of the character above-described have been directed toward a treatment of the calcium carbonate alone and before its incorporation with the adhesive. Such efforts have involved the pulverizing, grinding and milling of the calcium carbonate, either in wet or dry form. The most common prior practice of manufacturing calcium carbonate-adhesive coatings has been to first prepare a water slurry of relatively thick consistency of the calcium carbonate pigment, subjecting it to a mixing action to obtain proper dispersion and finally adding adhesive and water solution and continuing the mixing for proper uniform distribution of the adhesive.

When slurries of calcium carbonate and water of relatively thin or medium consistency, viz., up to 70% calcium carbonate, are mixed or milled with the adhesive such as casein, starch or "Alpha Protein," there is no substantial improvement in the amount of adhesive required for a specified adhesive property of the final coating, over the last-mentioned common prior practice procedure. Since the relatively thin and medium consistency calcium carbonate slurries more readily lend themselves to a mixing treatment, requiring less power and being capable of more convenient handling, it is of course, desirable that they might be employed as a starting product in the manufacture of adhesive coatings.

We have discovered that calcium carbonate slurries of consistencies up to 70% may be so treated by our process as to produce a substantial reduction in the amount of adhesive required for a given adhesive specification in the final coating.

Briefly, our invention involves the pre-addition of a portion of the adhesive to the calcium carbonate slurry, such portion being found to be within a critical range, mechanically treating, working or milling such mixture, and then adding the balance of the adhesive required for the specified adhesive property in the final coating. Additional water may also be added at the time of addition of the balance of the adhesive to produce a coating mixture of desired viscosity for the particular use to which it is to be applied.

We have also discovered that by reason of our invention the viscosity of the calcium carbonate-adhesive coating is greatly reduced as compared to prior art procedures. This latter result is of particular advantage in the application of the coating to the surface to which it is to be applied because it greatly reduces the amount of water which must otherwise be added to the coating in order to render it of sufficient fluidity to be properly spread upon the surface. This reduction in the amount of water required for reducing the consistency of the coating is also beneficial, in that it reduces the amount of drying required for the applied coating film.

Our invention possesses the further unexpected and unusual result in that the pre-addition of the critical amount of adhesive renders the mixture more fluid immediately upon milling. This unusual increase in the fluidity of the calcium carbonate slurry-adhesive mixture, or alternatively, reduction in viscosity, enables a more convenient and economical mechanical working or milling of the mixture. This phenomenon is all the more unusual when it is considered that the addition of casein, starch or "Alpha Protein" to the calcium carbonate slurry in an amount above the critical ranges herein specified causes a thickening effect upon the mixture.

We have also discovered that a mechanically treated mixture of calcium carbonate slurry and adhesive, the latter being present in amounts within our specified critical range, may be used as a base product for subsequent, comparatively simple mixing with water and additional adhesive, to produce the final coating mixture. This base product can be dried and placed in powdered form, as a new article of manufacture, for storage and transportation without at all affecting the improved results and advantages of the final coating. In fact, the dried base product derived from the calcium carbonate slurry milled with a portion of the finally required amount of adhesive, when subsequently mixed with water and the balance of adhesive, results in a further improvement in the adhesive properties of the final coating.

To the accomplishment of the foregoing and related ends, said invention, then, consists of the means hereinafter fully described and particularly pointed out in the claims.

The annexed drawing and the following description set forth in detail one method and one product exemplifying our invention, such disclosed procedure and product constituting, however, but one of various applications of the principle of our invention.

Figure 2:
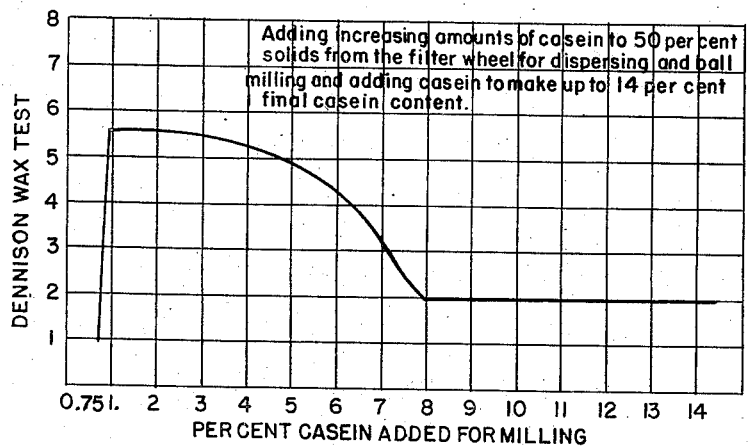

In said annexed drawing:

Fig. 1 is a chart showing the relationship for the required amount of casein adhesive, pre-added to a calcium carbonate slurry of a finite percentage for proper dispersion, to the consistency of the original slurry; Fig. 2 is a chart showing the relationship of the amount of casein to be pre-added to a selected calcium carbonate slurry to the adhesive properties or "Dennison wax test" of the final coating containing 14% casein.

While the amount of casein required for dispersion for any per cent solids in the slurry is represented in Fig. 1, nevertheless, the presence of amounts greater than the points on the curve can be used. The excess casein does not hinder the dispersion, although in fact, it decreases the efficiency of the milling procedure. Fig. 2 makes it clear that improvement of the adhesive properties results within all ranges of 1–5% pre-addition of casein, the maximum wax test being at that amount required for dispersion. The Dennison wax test values fall off significantly beyond 5 on the abscissa line of the co-ordinate diagram. Hence, the casein and extracted protein from soybean range is critical within 1–5%.

In the practice of our process, the high grade, precipitated calcium carbonate pigment, having a particle size in the range of 1 to 5 microns, together with water to form a slurry of up to 70% consistency, solids or calcium carbonate content, is used as a starting product. This starting product may conveniently be derived from a source in the precipitated calcium carbonate manufacturing process system. Thus, it is available as a 20% calcium carbonate slurry from the material introduced to the filtering stage in such system, as a 50% calcium carbonate slurry from the filter cake discharged from the filtering stage, as a 60% slurry from convenient points in the drying process, as dry calcium carbonate from the final stage of the precipitated calcium carbonate manufacturing system, subsequently mixed with water to any consistency in the range up to 70%.

It should also be obvious to anyone skilled in the art that the materials of these last-cited sources may equally well be intermixed, one with the other, to produce a calcium carbonate slurry starting product of desired consistency. This starting product is then mixed with a relatively small amount of adhesive such as casein, starch or "Alpha Protein," which produces a dispersion of the calcium carbonate uniformly and results in a homogeneous mixture. The amount of casein on the dry basis required for such dispersion of various consistencies of calcium carbonate slurry is represented by the curve in Fig. 1. It will be noted from this curve that the amount of casein required for dispersion increases with the amount of solids or consistency of the slurry, and that it rises quite rapidly in the range up to 2% casein and then tends to "flatten out." The reason for this latter effect may be correlated when further and subsequent results of our process are explained. Table I below, based upon observed values in Fig. 1 sets out the per cent of casein required to disperse various per cent slurries of calcium carbonate:

Table I

| Per cent casein | 1.10 | 1.13 | 1.17 | 1.23 | 1.30 | 1.41 | 1.55 | 1.73 | 1.98 | 2.32 | 2.86 |
|---|---|---|---|---|---|---|---|---|---|---|---|
| Per cent $CaCO_3$ | 20 | 25 | 30 | 35 | 40 | 45 | 50 | 55 | 60 | 65 | 70 |

The per cent of casein in terms of calcium carbonate can be expressed by the mathematical equation $y = 1.11 + 1.29 \, (10^{-7}) x^{3.844}$ where $y$ designates the per cent casein and $x$ designates the percent of calcium carbonate. The values of per cent casein calculated from this equation are in exceedingly close agreement with the values observed from the curve of Fig. 1 and tabulated in Table I supra. This is shown by the following tabular comparison:

Table II

| Per cent casein (observed) | 1.10 | 1.17 | 1.23 | 1.30 | 1.41 | 1.55 | 1.73 | 1.98 | 2.32 | 2.86 |
|---|---|---|---|---|---|---|---|---|---|---|
| Per cent casein (calculated) | 1.12 | 1.17 | 1.22 | 1.30 | 1.40 | 1.55 | 1.74 | 1.99 | 2.31 | 2.70 |
| Per cent $CaCO_3$ | 20 | 30 | 35 | 40 | 45 | 50 | 55 | 60 | 65 | 70 |

The dispersion of the calcium carbonate slurry with the relatively small amounts of casein results in a substantial reduction in viscosity. For example, a 50% calcium carbonate slurry alone is in the form of a thick mud. Upon dispersion of this thick mud with 1½ to 2% casein, the resultant mixture undergoes such a change in viscosity as to have a water-like fluidity.

The dispersed mixture of calcium carbonate, water and adhesive is then subjected to a mixing or mechanical treatment sufficient to impart a stress or mechanical force upon the solid particles of calcium carbonate. Such a mechanical treatment is suitably conducted in a mixing apparatus such as a ball, tube, pebble or colloid mill, or similar mixing apparatus capable of effecting intimate contact and mechanical working of the solids and liquids in the mixture. This mechanical treatment or milling may be performed for a period of time from one to five hours. Ball milling for 1½ hours is usually found to be sufficient in most cases. The length of time of such milling or mechanical treatment is, of course, not controlling or critical in the practice of our invention. It is not so important as the amount or degree of mechanical working imparted to the mixture. The type, size, speed and mixing efficiency of the particular mill or mixing apparatus employed are, of course, factors determining the time of mixing. After this mechanical treatment, the mixture may be dried and employed as a base product to be used by the coating applicator by merely stirring it with additional adhesive solution to make the final coating to be applied to paper or other surface.

Where the final coating product is to be produced by our process, the mechanically treated or milled mixture of calcium carbonate slurry and pre-added amount of adhesive then has the balance of the required amount of adhesive (to produce the given adhesive property in the final coating), simply added and stirred into the mixture. The adhesive property of a coating of the character described is determined according to the "Dennison wax test." The readings or numerical values for this Dennison wax test are determined by the use of a set of standard paper testing waxes (Dennison New Series No. 120A), which waxes, when heated and allowed to cool or set while in contact with the coated paper surface, have varying degrees of adhesion. The waxes are numbered in order of their degree of adhesion and are "picked" or lifted from the coated surface, and the lowest particular number of the wax in the numbered series which shows coating material upon its surface after being lifted therefrom, determines the "wax test" reading.

The calcium carbonate-adhesive coatings resulting from our above-described process and where casein is the particular adhesive employed, will satisfy the No. 5 Dennison wax test, where the total amount of casein present (on calcium carbonate basis) is 12%. The calcium carbonate slurries of a consistency comparable to those employed in our process, and which are either simply mixed or milled and worked with all of the final amount of casein present, will be found to require from 21 to 26% casein (dependent on amount of milling) to give a similar wax test of the number 5. Accordingly, our invention results in a 20 to 55% reduction in the amount of casein heretofore required for the same adhesive properties in the final coating.

The amount of casein pre-added and milled with the calcium carbonate slurry has been found to occur in a critical range. That is to say, the improved and beneficial results of achieving the foregoing reduction in the casein requirement for the final coating, are forthcoming only when the proportion of casein on the dry basis to the amount of calcium carbonate present in the milled or mechanically treated mixture is in the critical range of 1 to 5%. This criterion is further illustrated by reference to Fig. 2. The curve therein represents the adhesive properties or "Dennison wax test" number of the final coating as plotted against the percent of casein on the dry basis of the calcium carbonate pre-added to the calcium carbonate slurry. In the instance of the curve shown in Fig. 2, the slurry was of 50% consistency and the mixture, with the varying amounts of casein, was ball-milled for five hours, and the balance of the casein thereafter added to bring the content up to 14% in the final coating. From the curve it will be seen that this satisfactory No. 5 wax test requirement was met by coating in which casein in the range of 1 to 5% was pre-added to the milled mixture. From 5% on upwards, however, there occurs a sudden drop to only a No. 2 wax test and from here on, the adhesive properties of the final coating remain practically constant, regardless of the amount of casein initially added to the milled mixture. Of course, as more casein, viz., above 14%, is added to the mixture, the wax test number will again increase. However, these results do clearly reveal the substantial and critical difference between the pre-addition of 1 to 5% of the total amount of casein required before milling and the addition of the entire amount of casein added and then milled. To state this result in another way, no improvement in the adhesive properties of the final coating are obtained by the addition of over 5% casein prior to mechanical mixture and milling, and in order to secure any improvement in adhesive properties or increase in the wax test number, it is necessary to increase the total amount of casein in the coating, regardless of when or how it is added.

Referring back to Fig. 1, it will now be seen that the percent of casein required for dispersion of the various consistencies of calcium carbonate slurries falls within range of 1 to slightly above 3%. It can be seen by referring to Fig. 2 that there exists a correlation between the dispersing function of the casein and the improvement in the adhesive properties, when such casein is pre-added in the range of 1 to 5% to the slurry.

The following examples will serve to explain more fully the manner of practicing and the improved results of our invention:

*Example I*

A slurry of calcium carbonate of a 20% consistency was ball-milled for 1½ hours with 1% casein solution (on dry basis on calcium carbonate), 11% casein solution added after milling and with sufficient water to make into a coating color, the final coating color containing 12% total casein content. This coating, when applied, produced a No. 5 wax test. A 20% calcium carbonate slurry, made according to common prior art practice with all the casein solution merely stirred in and not milled with the slurry, requires 21% casein to give a No. 5 wax test. Our process in this example thus results in a 43% saving in casein requirement.

*Example II*

A 40% calcium carbonate slurry ball-milled for five hours with 2% casein and with 12% casein solution added after milling to make a final coating for application resulted in a No. 5 wax test. A 40% calcium carbonate slurry subjected to the common prior practice, as stated in Example I above, required over 21% total casein for a No. 5 wax test. In this instance, our process results in a 33% reduction in casein requirement.

Example III

A 50% calcium carbonate slurry was dispersed with 3% casein added and ball-milled for five hours, with 11% casein solution added thereafter to make into a completed coating for application, producing the wax test of No. 5.5. A calcium carbonate slurry of similar consistency with all of the casein requirement merely stirred into the mixture would require as high as 26% casein for a No. 5 wax test. A 50% calcium carbonate slurry with the entire requirement of casein added and the mixture ball-milled four or five hours, requires 18 to 19% casein for a No. 5 wax test. Our process in this instance results in a saving of 42 and 33% over the respective prior art methods last-mentioned.

Example IV

A slurry of 50% consistency with 1.55% casein was ball-milled for 5 hours and the balance of the casein added to bring the casein content up to 14% as set out previously in the specification. The Dennison wax test was between 5 and 6 as shown in Fig. 2.

Example V

A 60% calcium carbonate slurry with 2% casein added was ball-milled for five hours, with 10% casein solution then stirred in to make into the final coating color having a total casein content of 12%, which gave a wax test number of 6. A 60% calcium carbonate slurry treated by prior art processes, as described in above examples, requires 20 to 25% casein content for a comparable wax test number. Here is a 40–55% reduction in the amount of casein requirement.

Example VI

A 70% calcium carbonate slurry with 3% casein solution added was ball-milled for five hours, with 9% casein solution then added to make into a complete coating having a total casein content of 12%, which gave a wax test number of 6.5. A slurry of similar consistency without dispersion by the pre-addition of a portion of the casein and merely mixed with casein solution requires 21 to 24% of casein to give the same wax test number. Our process here results in a 50% reduction in casein requirement.

Where "Alpha Protein" is employed as the adhesive ingredient in the manufacture of calcium carbonate-adhesive coatings according to our process, the same novel characteristics and results as found in the use of casein, will follow. Thus, the range of the amounts of "Alpha Protein" pre-added to the calcium carbonate slurries falls within the same range of 1 to 5% on the dry calcium carbonate basis. The ultimate adhesive savings in the case of "Alpha Protein" are not quite as great as in the case of casein, but still are as high as 25 to 30%, as compared to prior art procedures. The following example serves to illustrate the improved results obtained by our invention, where "Alpha Protein" is used as the adhesive:

Example VII

A 60% calcium carbonate slurry with 2¼% "Alpha Protein" added was ball-milled for five hours, and 11¾% "Alpha Protein" solution then stirred in to produce a final coating color having a total "Alpha Protein" content of 14%, which gave a wax test number of 7. A 60% calcium carbonate slurry with the entire requirement of "Alpha Protein" added and mixed required 20% "Alpha Protein" to give an equivalent wax test. The resultant adhesive saving in this instance is 30%.

In the case of the employment of starch as the adhesive ingredient, it is found that the critical range for the amount pre-added to the mixture is narrower than in the case of casein and "Alpha Protein." This critical range for starch is found to be between 2 and 3% by weight of the calcium carbonate on the dry basis. Thus, the curve representing this critical pre-addition range effect for starch would be similar in characteristics to the curve shown in Fig. 2, but the "hump" or sudden rise and fall in the curve would be much narrower, viz., between 2 and 3% abscissas of the coordinate diagram.

The following example illustrates the results obtained by our invention when starch is employed as the adhesive ingredient:

Example VIII

A 60% calcium carbonate slurry with 2½% gum starch added was ball-milled for five hours, with 13½% starch solution added and stirred into the mixture to make a final coating color having a total starch content of 16%, this coating giving a wax test number of 6½. A 60% calcium carbonate slurry with the entire requirement of gum starch adhesive added and mixed in required 32½% starch to produce an equivalent wax test. Our process, in this instance, here results in a 50.8% saving in adhesive requirement.

It has been found that in order to obtain a wax test number of 5, the minimum requirement or specification for satisfactory calcium carbonate coatings, as low as 12% of "Alpha Protein" and 14% of gum starch may be used in our process.

Other modes of applying the principle of our invention may be employed instead of the one explained, change being made as regards the product and method herein disclosed, provided the step or steps stated by any of the following claims or the equivalent of such stated step or steps be employed.

We, therefore, particularly point out and distinctly claim as our invention:

1. In the manufacture of calcium carbonate-adhesive fluid coating capable of producing a Dennison wax test of at least 5, the steps of mixing precipitated calcium carbonate having a particle size of from 1 to 5 microns with a solution of adhesive selected from the group consisting of casein and "Alpha Protein," wherein the amount of calcium carbonate is from 20–70% of the weight of the slurry and the amount of said adhesive is between 1% and 5% on the basis of calcium carbonate and wherein the minimum amount of adhesive corresponds closely to the equation $y = 1.11 + 1.29 \, (10^{-7}) x^{3.844}$ where $y$ designates per cent adhesive and $x$ designates per cent solids in the slurry, then subjecting such mixture to a mechanical attrition treatment securing thereby an intimate mixture of reduced viscosity and thereafter stirring in the balance of the previously selected adhesive, the total amount of said adhesive being not over 12% on the basis of dry calcium carbonate.

2. In the manufacture of calcium carbonate-adhesive fluid coating capable of producing a Dennison wax test of at least 5, the steps of mixing precipitated calcium carbonate having a particle size of from 1 to 5 microns in a solution of adhesive selected from the group consisting of casein and "Alpha Protein", wherein the amount of calcium carbonate is from 20–70% of the weight of the slurry and the amount of said adhesive is between 1% and 5% on the basis of calcium carbonate and wherein the minimum amount of adhesive corresponds closely to the equation $y=1.11+1.29(10^{-7})x^{3.844}$ where $y$ designates per cent adhesive and $x$ designates per cent solids in the slurry, then subjecting such mixture to a mechanical attrition treatment securing thereby an intimate mixture of reduced viscosity, and thereafter stirring in the balance of the previously selected adhesive, the total amount of said adhesive being not over 14% on the basis of dry calcium carbonate.

3. In the manufacture of calcium carbonate-adhesive fluid coating capable of producing a Dennison wax test of at least 5, the steps of dispersing precipitated calcium carbonate, having a particle size from 1 to 5 microns, in a solution of adhesive selected from the group consisting of casein and "Alpha Protein," wherein the amount of calcium carbonate is 20-70% of the weight of the slurry and the amount of said adhesive is between 1% and 5% calculated on the basis of calcium carbonate and wherein the minimum amount of adhesive corresponds closely to the equation $y=1.11+1.29(10^{-7})x^{3.844}$ where $y$ designates per cent adhesive and $x$ designates per cent solids in the slurry, then subjecting such dispersion to a mechanical attrition treatment securing thereby an intimate mixture of reduced viscosity, and thereafter stirring in an amount of the previously selected adhesive greater than that previously added, the total amount of the adhesive being less than the amount required when single step milling the same amount of calcium carbonate to attain identical wax test.

4. In the manufacture of a base product for calcium carbonate-adhesive coatings, the steps of dispersing precipitated calcium carbonate having a particle size from 1 to 5 microns, in a solution of adhesive selected from the group consisting of casein and "Alpha Protein," wherein the amount of calcium carbonate is 20-70% of the slurry and the amount of said adhesive is between 1% and 5% calculated on the basis of calcium carbonate and wherein the minimum amount of adhesive corresponds closely to the equation $y=1.11+1.29(10^{-7})x^{3.844}$ where $y$ designates per cent adhesive and $x$ designates per cent solids, then subjecting such dispersion to a mechanical attrition treatment securing thereby an intimate mixture of reduced viscosity, thereafter drying said mixture as a base product.

5. In the manufacture of calcium carbonate fluid coatings, capable of producing a Dennison wax test of at least 5, the steps of dispersing precipitated calcium carbonate, having a particle size from 1 to 5 microns, in a solution of adhesive selected from the group consisting of casein and "Alpha Protein," wherein the amount of calcium carbonate is 20-70% of the slurry and the amount of said adhesive is between 1% and 5% calculated on the basis of calcium carbonate and wherein the minimum amount of adhesive corresponds closely to the equation $$y=1.11+1.29(10^{-7})x^{3.844}$$

where $y$ designates percent adhesive and $x$ designates per cent solids in the slurry, then subjecting such dispersion to a mechanical attrition treatment securing thereby an intimate mixture of reduced viscosity, thereafter stirring in the balance of the previously selected adhesive greater in amount than that previously added, and adding water to attain a suitable coating consistency, the total amount of the adhesive being less than the amount required when single step milling the same amount of calcium carbonate to attain identical wax test.

6. In the manufacture of a base product for calcium-carbonate coatings, the steps of providing a slurry of precipitated, 1-5 micron size calcium carbonate and water, having a calcium carbonate content of from 20-70%, adding 1-5% adhesive selected from the group consisting of casein and "Alpha Protein" and wherein the minimum amount of adhesive corresponds closely to the equation $y=1.11+1.29(10^{-7})x^{3.844}$ where $y$ designates per cent adhesive and $x$ designates per cent solids in the slurry, then subjecting such mixture to a mechanical attrition treatment securing thereby an intimate mixture of reduced viscosity and thereafter drying such mixture as a base product.

7. In the manufacture of a base product for calcium carbonate coatings, the steps of providing a slurry of precipitate, 1-5 micron size calcium carbonate and water having a calcium carbonate content of from 20-70%, adding 1-5% adhesive selected from the group consisting of casein and "Alpha Protein" and wherein the minimum amount of adhesive corresponds closely to the equation $y=1.11+1.29(10^{-7})x^{3.844}$ where $y$ designates per cent adhesive and $x$ designates per cent solids in the slurry, then ball milling such mixture securing an intimate mixture of reduced viscosity, and thereafter drying such mixture.

8. In the manufacture of calcium carbonate-adhesive fluid coatings capable of producing a Dennison wax test of at least 5, the steps of providing a slurry of precipitated, 1-5 micron size calcium carbonate in water, having a calcium carbonate content of from 20-70%, adding 1-5% adhesive selected from the group consisting of casein and "Alpha Protein" and wherein the minimum amount of adhesive corresponds closely to the equation $y=1.11+1.29(10^{-7})x^{3.844}$ where $y$ designates the per cent protein and $x$ designates per cent solids, then subjecting such mixture to a mechanical attrition treatment securing thereby an intimate mixture of reduced viscosity, thereafter stirring in an amount of the previously selected adhesive greater in amount than that previously added, the total amount of the adhesive being less than the amount required when single step milling the same amount calcium carbonate to attain an identical wax test, and adding sufficient water to attain a suitable coating consistency.

9. Method of treating a calcium carbonate pigment having a particle size ranging from 1 to 5 microns which comprises subjecting to a mechanical attrition treatment an aqueous suspension of the pigment mixed with casein, the aqueous suspension of pigment being of a concentration from 20-70% of the weight of the suspension and containing the casein in an amount between 1% and 5% by weight based on the dry weight of said pigment.

AUSKER E. HUGHES.
HAROLD B. BROWNE.
HOWARD F. RODERICK.